United States Patent
Floyd et al.

(10) Patent No.: US 8,478,714 B2
(45) Date of Patent: Jul. 2, 2013

(54) INTEGRATED DISTRIBUTION MANAGEMENT SYSTEM CHANNEL ADAPTER

(75) Inventors: Gregory Ray Floyd, McDonough, GA (US); Steven Kirk Hubbartt, Hiram, GA (US)

(73) Assignee: Southern Company Services, Inc., Atlanta, GA (US)

( * ) Notice: Subject to any disclaimer, the term of this patent is extended or adjusted under 35 U.S.C. 154(b) by 234 days.

(21) Appl. No.: 13/010,309

(22) Filed: Jan. 20, 2011

(65) Prior Publication Data
US 2012/0191665 A1     Jul. 26, 2012

(51) Int. Cl.
*G06F 7/00*     (2006.01)
*G06F 17/00*    (2006.01)
*G06F 15/16*    (2006.01)

(52) U.S. Cl.
USPC ........................... 707/602; 709/227

(58) Field of Classification Search
None
See application file for complete search history.

(56) References Cited

U.S. PATENT DOCUMENTS

| | | | | |
|---|---|---|---|---|
| 5,826,195 A | * | 10/1998 | Westerlage et al. | 455/456.3 |
| 2006/0067209 A1 | * | 3/2006 | Sheehan et al. | 370/216 |

\* cited by examiner

*Primary Examiner* — Uyen Le
(74) *Attorney, Agent, or Firm* — Thomas Horstemeyer, LLP

(57) ABSTRACT

Disclosed are various embodiments for communicating with an integrated distribution management system (IDMS). An IDMS often employs a communications protocol that is incompatible with a service oriented architecture. Accordingly, embodiments of the disclosure can allow utility computing systems in a service oriented architecture or in a messaging based environment to communicate with an IDMS.

14 Claims, 7 Drawing Sheets

INTEGRATED DISTRIBUTION MANAGEMENT SYSTEM CHANNEL ADAPTER

BACKGROUND

Advanced Metering Infrastructure (AMI) deployments are increasing in prevalence because AMI deployments can reduce labor costs as well as increase billing efficiency relative to other utility metering deployments. Additionally, AMI deployments are increasingly supported by back end systems implemented in a service oriented architecture. An integrated distribution management system (IDMS) can be employed in the utility industry to facilitate management of the operations of an electric utility. Accordingly, an IDMS employs for a communication language interfacing with other systems in a utility environment that can be incompatible with a service oriented architecture.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure facilitate communication of a utility metering and computing environment with an integrated distribution management system (IDMS). An IDMS is a system that can include one or more computing devices that facilitate decision-making in utility environment, such as in an electric utility. The IDMS is a standardized framework that provides tools that allow operators of a utility to make operational decisions, facilitate disaster and outage recovery, deploy maintenance workers, track customer issues, and perform other various tasks relevant to the running of an electric utility.

Many implementations of an IDMS require that systems in communication with the IDMS do so in a communication language and/or protocol that can involve commands issued, for example, over a transmission control protocol (TCP) socket with a client. Communications with an IDMS may involve a bidirectional session in which textual or binary commands are transmitted back and forth between the IDMS and a client. Such a communications protocol that does not incorporate service oriented architecture messaging concepts can be prohibitively complex to implement and maintain in all of the various systems in a utility environment that may need to communicate with the IDMS. Therefore, an IDMS channel adapter according to various embodiments of the present disclosure allow the various systems in a utility computing environment to be implemented in a service oriented architecture, thereby allowing a utility operator to realize the various operational advantages that can be obtained in such an implementation.

Figure 1:
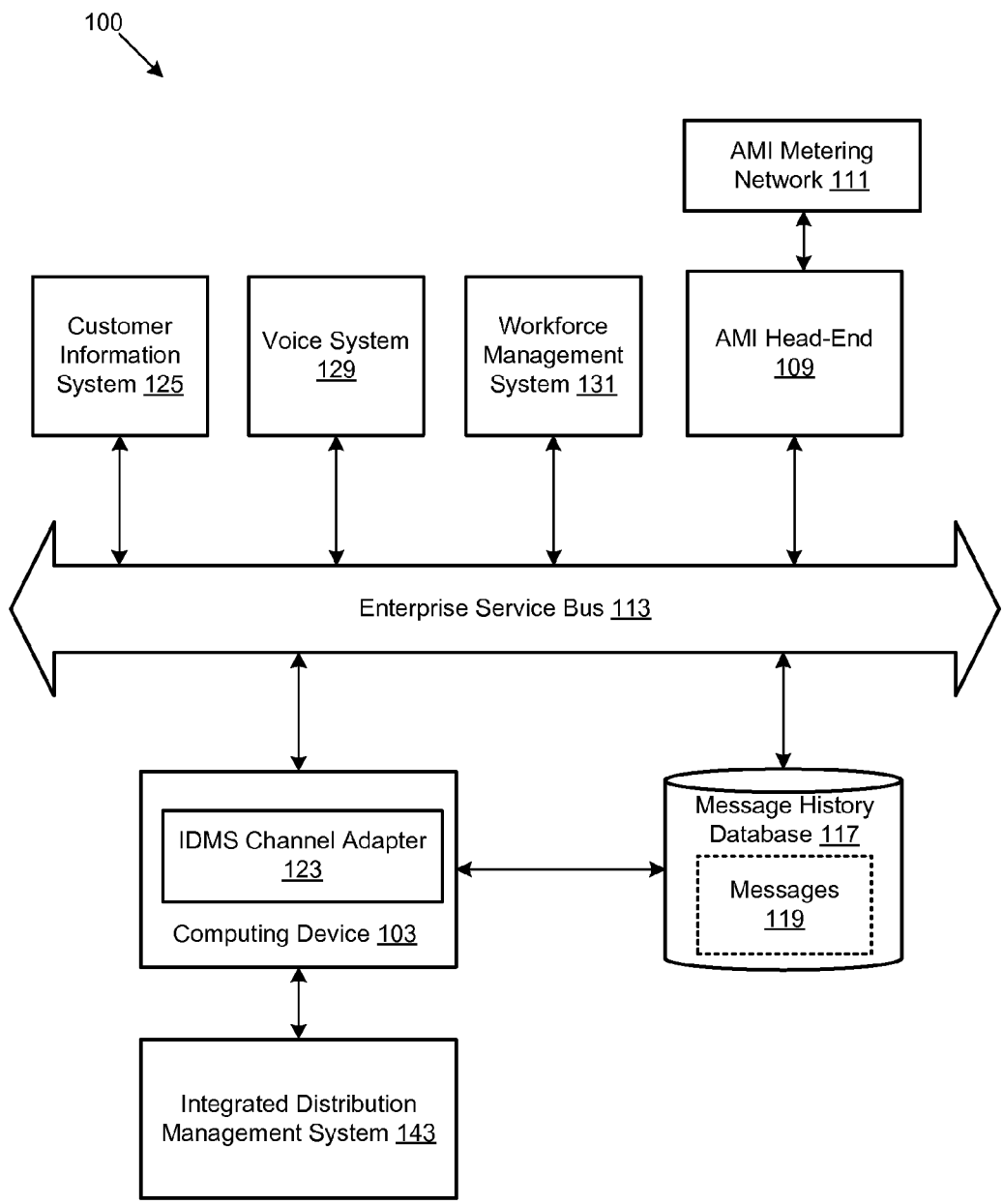
FIG. 1 is a drawing of a utility metering and computing environment in which an IDMS channel adapter can be implemented according to various embodiments of the present disclosure.

With reference to FIG. 1, shown is a utility computing environment 100 according to various embodiments. The utility computing environment 100 includes a computing device 103 in communication with various systems that facilitate the operation of a utility environment. The computing device 103 can be in communication with one or more other systems over an appropriate network. Such a network may comprise, for example, the Internet, intranets, wide area networks (WANs), local area networks (LANs), wireless networks, or other suitable networks, etc., or any combination of two or more such networks.

The various systems in the environment can include an AMI head-end 109, which can further be in communication with an AMI metering network 111. The AMI head-end 109 can receive utility usage information from a fleet of utility metering devices, communications towers, etc., that are deployed at various customer premises within the AMI metering network 111. A metering vendor facilitating deployment of an AMI utility metering environment often provides one or more AMI head-ends 109 which interface with various utility metering devices in an AMI metering network 111 to collect usage data, alarm messages, outage reports and other statistics, values and metrics that can originate from the AMI metering network 111.

It should be appreciated that a utility metering device can also include, in some embodiments, any device, such as an impedance fault detection device, that can report data to an AMI head-end 109. A utility metering device can consume or provide power in a utility metering environment. In some embodiments, communication between metering devices and the AMI head-end 109 can be accomplished with utility metering devices that are configured to transmit data via a two way power line carrier (PLC) system infrastructure. Accordingly, in such an embodiment, utility metering devices can be in communication with a distribution substation or other infrastructure, which can receive data via a PLC protocol and forward any received data to the AMI head-end 109.

Also shown in the utility computing environment 100 of FIG. 1 is an enterprise service bus (ESB) system 113 that is in communication with the AMI head-end 109 as well as the other systems in the environment 100. The ESB system 113 can facilitate an enterprise service bus configured to support messaging between the various components shown in the environment of FIG. 1. In other words, the enterprise service bus can act as an intermediary between the AMI head-end 109, the computing device 103 as well as other systems to facilitate the transmission of data there between. The enterprise service bus may also be referred to as a "message broker" or an intermediary program that transforms messages from a one system to another, thereby allowing the systems to send data back and forth to one other. For example, the AMI head-end 109 may transmit events in an extensible markup language (XML) format over Hypertext Transfer Protocol (HTTP), which can then be transformed by the ESB 113 into plain text or other formats for other systems in the utility computing environment 100. In other words, the ESB 113 provides functionality to support interoperable machine to machine interaction over a network in potentially varying message formats. The specific functionality provided by an ESB 113 should be appreciated to those of ordinary skill in the art, and is not discussed in detail herein.

The utility computing environment 100 can also include a message history database 117 which can act as a repository of messages, notifications, events, or other data transmitted within in the depicted environment 100. The message history database 117 can include a message history 119, and potentially other data. The message history database 117 can comprise a structured query language (SQL) based database or other database system. The message history database 117 can store data in a relational table structure or other storage formats as can be appreciated. For example, the message history database 117 can comprise a NoSQL database management system without fixed table schemas. The particular configuration of the message history database 117 can vary according to various implementations of embodiments of the disclosure, as can be appreciated.

As one example, messages transmitted within the utility computing environment 100 can be stored in various data store table structures that vary from the depicted example. The message history database 117 can also be implemented in a bank of server computing devices for scalability and data redundancy purposes. The message history database 117 shown in FIG. 1 is given for ease of depiction and discussion of the various embodiments of the present disclosure and is but one example.

The utility computing environment 100 can also include other systems, such as, but not limited to, a customer information system 125, a voice system 129, and a workforce management system 131. The customer information system 125 can provide data about utility customers that may be used for operational, billing, or other purposes. As one example, information received from a utility metering device associated with a meter identifier in the AMI metering network 111 can be matched to customer information from the customer information system 125. The voice system 129 can capture customer reported outage or other operational issues and forward the captured information to other systems in the utility computing environment 100. As one non-limiting example, the voice system 129 can capture voice and/or touch-tone input from a customer or other user regarding an outage or other operational issue, communicate with the customer information system 125 to identify a customer account associated with voice and/or touch-tone input received from a user, and forward the information to another system in the environment so that the outage or operational issue is addressed.

The workforce management system 131 can facilitate allocation, dispatching and/or tracking of workforce personnel as well as material involved in maintaining and/or restoring utility service that is managed in the utility computing environment 100. The workforce management system 131 can include functionality that facilitates efficient managing of personnel, vehicles, or other equipment as can be appreciated. In one embodiment, the workforce management system 131 can issue maintenance tickets and allocate personnel and/or equipment based upon geography, skill, time and other factors as can be appreciated.

Any or all of the systems in the utility computing environment 100 may be in communication with an integrated distribution management system (IDMS) 143. As described above, the IDMS can facilitate decision-making in an electric utility environment. The IDMS can provide user terminals that provide tools that allow operators of a utility to make operational decisions, facilitate disaster and outage recovery, deploy maintenance workers, track customer issues, and perform other various tasks relevant to the running of an electric utility. Therefore, the IDMS may require communication with the various systems in the utility computing environment 100 to facilitate management of utility operations. However, communications with some IDMS implementations occur using a communications protocol, which can, in one embodiment, require the opening of a TCP socket with the IDMS and the issuing of commands in a bidirectional communication session. Such an architecture may not lend itself to compatibility with an asynchronous messaging framework that can be employed in a service oriented architecture.

Accordingly, the computing device 103 can execute an IDMS channel adapter 123, which can facilitate communication between the various systems in the utility computing environment 100 and the IDMS 143. The IDMS channel adapter 123 can communicate with the IDMS 143 using a protocol in which the IDMS 143 is configured to communicate in a TCP session, for example, and with the rest of the utility computing environment 100 in a service oriented architecture messaging protocol. Additionally, the IDMS channel adapter 123 can expose the various systems in the utility computing environment 100 to the IDMS 143 so that the IDMS 143 can perform various functionality in the course of managing the operations of the utility. The computing device 103 and/or IDMS channel adapter 123 can be in communication with one or both of the message history database 117 and the ESB 113.

The computing device 103, AMI head-end 109, message history database 117, ESB 113, customer information system 125, voice system 129, workforce management system 131, and IDMS 143 may comprise, for example, a computing device, a server computer or any other system providing computing capability or resources. Alternatively, a plurality of computing devices may be employed that are arranged, for example, in one or more server banks or computer banks or other arrangements. For example, a plurality of computing devices together may comprise, for example, a cloud computing resource, a grid computing resource, and/or any other distributed computing arrangement. Such computing devices may be located in a single installation or may be distributed among many different geographical locations. Additionally, some components executed on a computing device can be executed in one installation, while other components can be executed in another installation. For purposes of convenience, the computing device is referred to herein in the singular. Even though the computing device is referred to in the singular, it is understood that a plurality of computing devices may be employed in the various arrangements as described above.

It should be appreciated that the AMI metering network 111 can comprise one or more utility metering devices that can be in wireless communication with the AMI head-end 109. As should be appreciated, utility metering devices can be configured to provide one-way communication or two-way communication to report usage data associated with a meter, status information, alarm messages, and other administrative data. Additionally, in two-way systems, administrative information or various commands that can cause a utility metering device to take some course of action can be transmitted to the utility metering devices via a communications tower. As one example, the AMI head-end 109 can transmit a command via a communications tower causing a utility metering device to report usage data. It should further be appreciated that a utility metering device can also interact with any system (e.g., a computing device, a metering collection device, a vehicle mounted metering collection device, a mobile collector, a local area fixed collector, etc.) complying with a communications protocol specified by the metering infrastructure, regardless of whether such a system is transmitting data and/or messages via the depicted communications towers.

Utility metering devices can, in some embodiments, transmit and/or receive data wirelessly to and from the AMI head-end 109 via one or more communications towers. In one embodiment, utility metering devices can communicate with the AMI head-end 109 via wireless messages in a proprietary or non-proprietary format in licensed or unlicensed wireless spectrum. In other embodiments, the AMI head-end 109 can communicate with metering devices via standardized cellular communications technology such as, but not limited to, GPRS, CDMA, and other technologies as can be appreciated.

Various applications and/or other functionality may be executed in the computing device 103 according to various embodiments. As noted above, in the depicted non-limiting embodiment, the meter computing device 103 can execute an IDMS channel adapter 123 that can include various modules that facilitate the functionality described herein. It should be appreciated that the depicted arrangement of an IDMS channel adapter 123 executing various modules is but one non-limiting example of an arrangement of an embodiment of the disclosure given for ease of depiction as well as discussion herein. It should also be appreciated that embodiments of the disclosure can be implemented in various ways. As one example, the logic of an IDMS channel adapter 123 can be implemented as logic within the framework of a module of the ESB 113. Other variations should be appreciated by a person of ordinary skill in the art.

Now that a general description of the various components in the utility computing environment 100 has been provided, a description of the operation of the various components is provided. As described above, the IDMS is a system that operates using a communications language and/or communications protocols that can be incompatible with a service oriented architecture. As such, communication with the IDMS can require the opening of a TCP socket and communication with the IDMS within the socket in a TCP session. Accordingly, the IDMS channel adapter 123 allows the various elements in a utility computing environment 100 to be implemented according to a service oriented architecture, an asynchronous messaging architecture, or any other standard that a utility operators wishes to implement. In other words, the IDMS channel adapter can act as a broker between the IDMS 143 and the ESB 113, through which the various systems in the environment 100 communicate with one another.

In one embodiment, when an IDMS 143 sends data to a recipient system in the utility computing environment 100, such as, a utility metering device in the AMI metering network 111, the AMI head-end 109, the voice system 129, the customer information system 125, the workforce management system 131, etc., the IDMS 143 can do so by establishing a session with the IDMS channel adapter 123 executed in the computing device 103. The IDMS channel adapter 123 can open a TCP socket and establish a TCP session with the IDMS 143 and receive a message for a recipient system in the utility computing environment 100 from the IDMS 143.

In one embodiment, the IDMS channel adapter 123 can translate the message from the IDMS into a in a canonical message format, or a common format around which the utility computing environment 100 can be standardized. In one embodiment, the canonical message format can include a format defined in extensible markup language (XML) or any format that is known to the systems that interface with one another in the utility computing environment 100. Such a message format can include a destination field or attribute that can designate the recipient system in the utility computing environment 100 so that the ESB 113 can forward the message to the designated recipient system. The message can then be published on the ESB 113 with a destination designation for the recipient system in the utility computing environment 100.

In some embodiments, the IDMS channel adapter 123 can transmit a message from the IDMS 143 for a recipient system directly to the system in a canonical message format. In other embodiments, the IDMS channel adapter 123 can store convert data received from the IDMS 143, convert the data into the canonical message format and store the message in the message history database 117. Accordingly, the recipient system can poll the message history database 117 for messages with a destination designation for the recipient system, which can be retrieved by the recipient system from the message history database 117.

In one non-limiting example, the IDMS 143 may attempt to initiate an AMI heartbeat request, which is utilized to periodically verify that the AMI head-end 109 is available to accept messages. Accordingly, in one embodiment, the IDMS channel adapter 123 can establish a TCP session with the IDMS 143 and receive such a request to communicate with the AMI head-end 109. The IDMS channel adapter 123 can generate a heartbeat request in a canonical message format, which can be published via the ESB 113 with a destination designation for the AMI head-end 109. In response, the AMI head-end 109 can publish a response to the heartbeat request on the ESB 113 with a destination designation for the IDMS channel adapter 123. In one embodiment, such a response can be stored in the message history database 117. Accordingly, the IDMS channel adapter 123 can poll the message history database 117 for a response to the heartbeat request, translate the response to the heartbeat request to a format expected by the IDMS 143, which can in turn be transmitted to the IDMS 143 via the TCP session. In the event that a response to the heartbeat request is not received, the IDMS channel adapter 123 can transmitted an error message or a negative acknowledgement (NACK) to the IDMS 143.

In another example, the IDMS 143 may attempt to ping a particular metering device in the AMI metering network 111. Accordingly, in one embodiment, the IDMS channel adapter 123 can receive such a request in a TCP session. The IDMS channel adapter 123 can transform the ping request into a canonical message format and publish the message on the ESB 113 and/or store the message in the message history database 117. The ping request message can be received by the AMI head-end 109, which can process the ping request in the AMI metering network 111. A response to the ping request can be published on the ESB 113 and/or stored in the message history database 117. The IDMS channel adapter 123 can receive the response to the ping request from the IDMS 143 via the ESB 113 and/or by polling the message history database 117 until a response is detected. The IDMS channel adapter 123 can then transmit a response via the TCP session to the IDMS 143. As noted above, if no response is received, the IDMS channel adapter 123 can transmit an error message and/or a NACK to the IDMS 143.

As another example, the IDMS 143 may attempt to generate a work order in a workforce management system 131 in response to an outage or other maintenance issue. Accordingly, the IDMS 143 can transmit a command to issue a work order via the IDMS channel adapter 123 in a TCP session. Accordingly, the IDMS channel adapter 123 can generate a message in the canonical message format to and publish the message on the ESB 113 and/or cause the message to be stored in the message history database 117. Accordingly, in one embodiment, the workforce management system 131 can receive the message by polling the message history database 117 and generate a work order. The workforce management system 131 can issue an acknowledgement and/or a negative acknowledgement to the IDMS 143 by publishing such a message on the ESB 113 and/or causing such a message to be stored in the message history database 117. Accordingly, the IDMS channel adapter 123 can poll the message history database 117 for the response and/or receive the response from the ESB 113 and transmit the response in a format acceptable to the IDMS 143 via the TCP session.

Accordingly, the above examples illustrate various ways in which various systems in the utility computing environment 100 can communicate with the IDMS 143 via the IDMS channel adapter 123. In this way, the IDMS 143 can communicate with various systems in a utility computing environment 100 implemented in a service oriented architecture even though the IDMS 143 communicates with external systems using a communications protocol and/or language in which the IDMS 143 is configured to communicate as described above.

Referring next to FIGS. 2-6, shown are various flowcharts that provide examples of the operation of a portion of the IDMS channel adapter 123 according to various embodiments. It is understood that the flowcharts of FIGS. 2-6 provide merely examples of the many different types of functional arrangements that may be employed to implement the operation of the portion of the IDMS channel adapter 123 as described herein. As an alternative, the flowcharts of FIGS. 2-6 may be viewed as depicting an example of steps of a method implemented in the computing device 103 (FIG. 1) according to one or more embodiments. The flowcharts of FIGS. 2-6 illustrate various ways in which the IDMS channel adapter 123 can facilitate communication between the IDMS and other systems in the utility computing environment 100.

Figure 2:
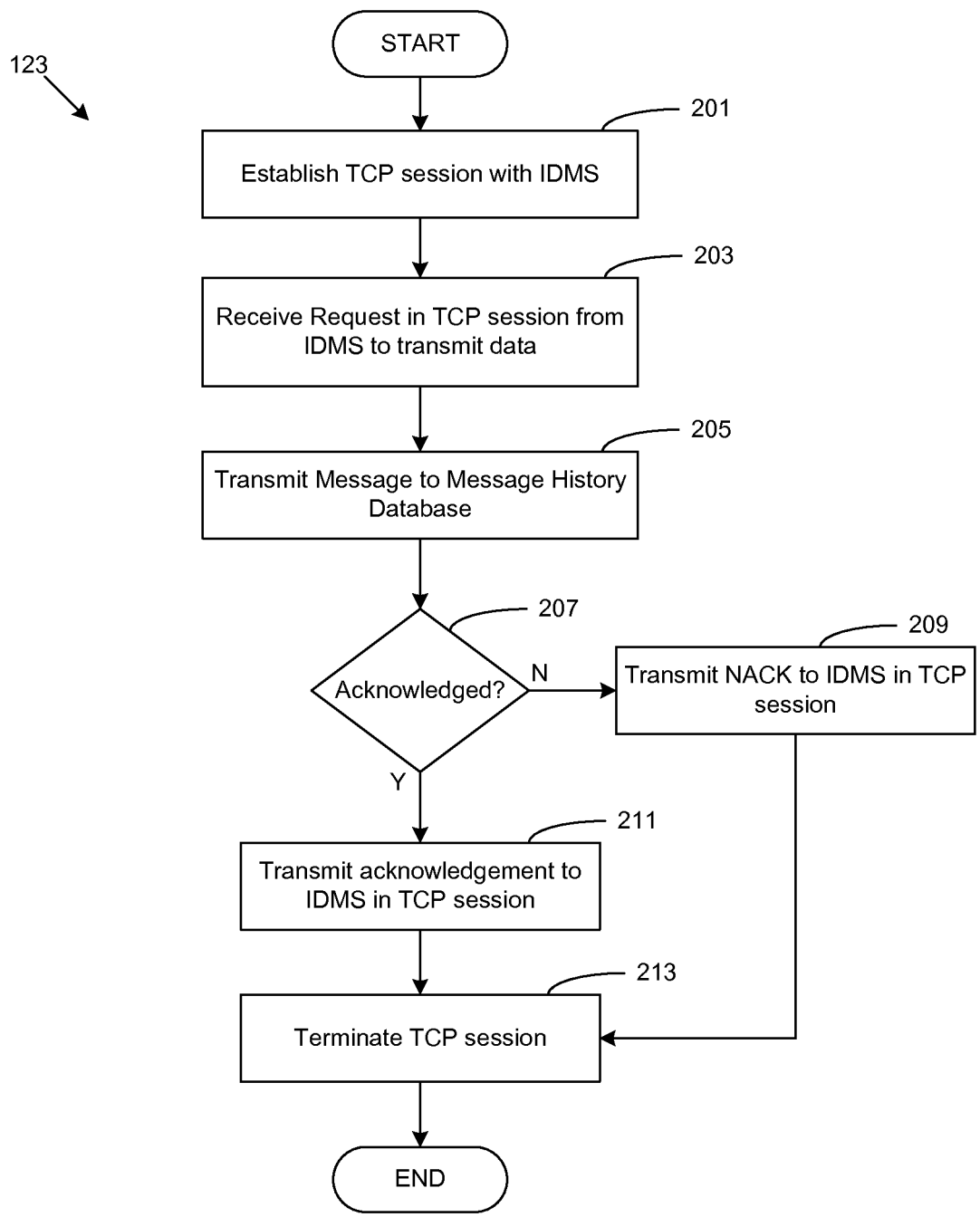
FIGS. 2-6 are flowcharts illustrating examples of functionality implemented as portions of the IDMS channel adapter executed in a computing device in the environment of FIG. 1 according to various embodiments of the present disclosure.

FIG. 2 illustrates one example an IDMS 143 transmitting data (e.g., a message, request, or other information) to a recipient system in the utility computing environment 100 via the IDMS channel adapter 123. In box 201, the IDMS channel adapter 123 establishes a TCP session with the IDMS 143. As described above, such a session can involve the opening of a TCP socket with the IDMS 143 and bidirectional communication over a session using commands specified by the IDMS 143. The IDMS channel adapter 123, in box 203, receives a request from the IDMS to transmit data to a recipient system in the utility computing environment 100. In box 205, the channel adapter can translate the request from the IDMS 143 into a canonical message format and cause the canonical message to be stored in the message history database 117.

The recipient system can then retrieve the message from the message history database 117, which can transmit an acknowledgement or a response to the request to the IDMS channel adapter 123. In box 207, the IDMS channel adapter 123 can determine whether the message has been acknowledged by the recipient system. If the message has not been received and/or acknowledged by the recipient system, then in box 209, the IDMS channel adapter 123 can transmit an error message and/or a negative acknowledgement to the IDMS 143. If the message has been acknowledged or a response has been generated by the recipient system, the IDMS channel adapter 123 can transmit an acknowledgement and/or response in box 211. In box 213, the IDMS channel adapter 123 can terminate the TCP session.

Figure 3:
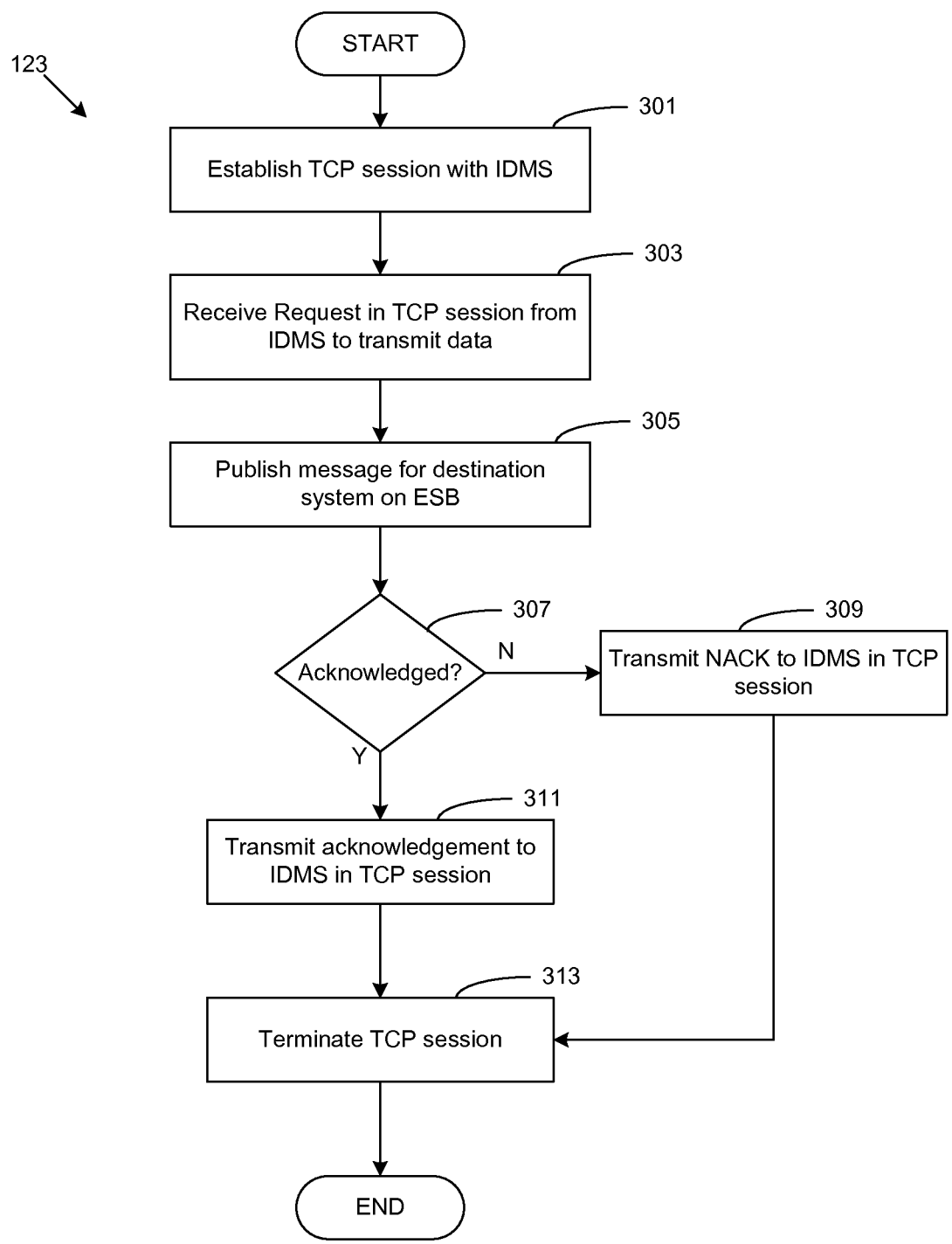

FIG. 3 depicts an alternative approach in which the IDMS 143 can transmit data to a recipient system in the utility computing environment 100 via the IDMS channel adapter 123. In box 301, the IDMS channel adapter 123 establishes a TCP session with the IDMS 143. The IDMS channel adapter 123, in box 303, receives a request from the IDMS to transmit data to a recipient system in the utility computing environment 100. In box 305, the channel adapter can translate the request from the IDMS 143 into a canonical message format and publish the message on the ESB 113.

The recipient system can receive the message from the ESB 113, which can transmit an acknowledgement or a response to the request to the IDMS channel adapter 123. In box 307, the IDMS channel adapter 123 can determine whether the message has been acknowledged by the recipient system. If the message has not been received and/or acknowledged by the recipient system, then in box 309, the IDMS channel adapter 123 can transmit an error message and/or a negative acknowledgement to the IDMS 143. If the message has been acknowledged or a response generated by the recipient system, the IDMS channel adapter 123 can transmit an acknowledgement and/or response in box 311. In box 313, the IDMS channel adapter 123 can terminate the TCP session.

Figure 4:
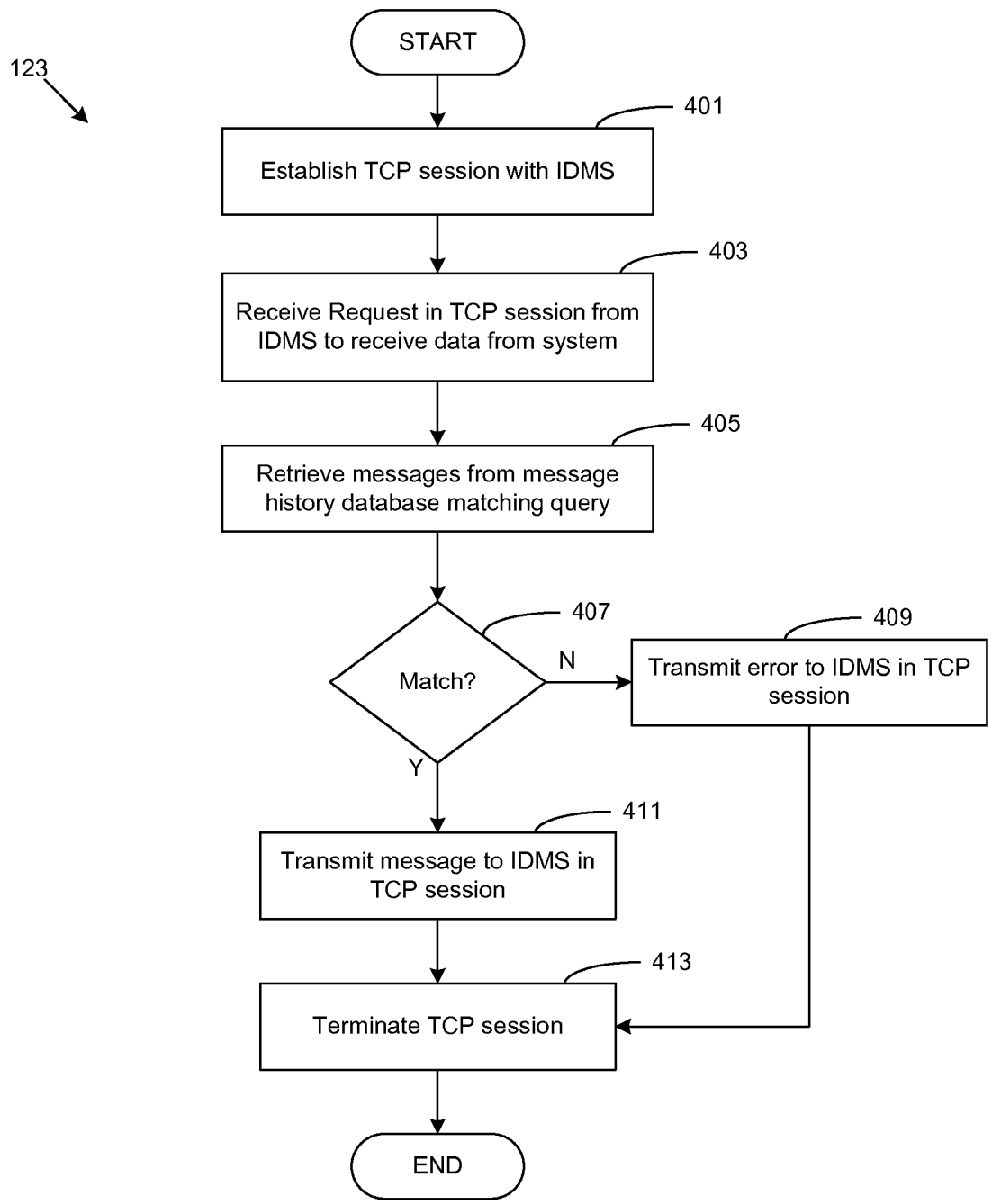

FIG. 4 illustrates one approach in which the IDMS 143 can receive data from a system in the utility computing environment 100. The IDMS channel adapter 123 can establish a session with the IDMS 143 in box 401. In box 403, the IDMS channel adapter 123 can receive a request in the TCP session to receive and/or retrieve certain data from a particular system in the utility computing environment 100. In box 405, the IDMS channel adapter 123 can determine if there are any messages in the message history database that match the data requested by the IDMS 143. In box 407, the channel adapter determines whether the data requested by the IDMS 143 is stored in the message history database 117. If there is no match, then in box 409, the channel adapter can transmit an error message to the IDMS in the TCP session. Alternatively, if there is a match, then in box 411 the IDMS channel adapter 123 can transmit the message to the IDMS 143 in the TCP session, after which the TCP session can be terminated in box 413.

Figure 5:
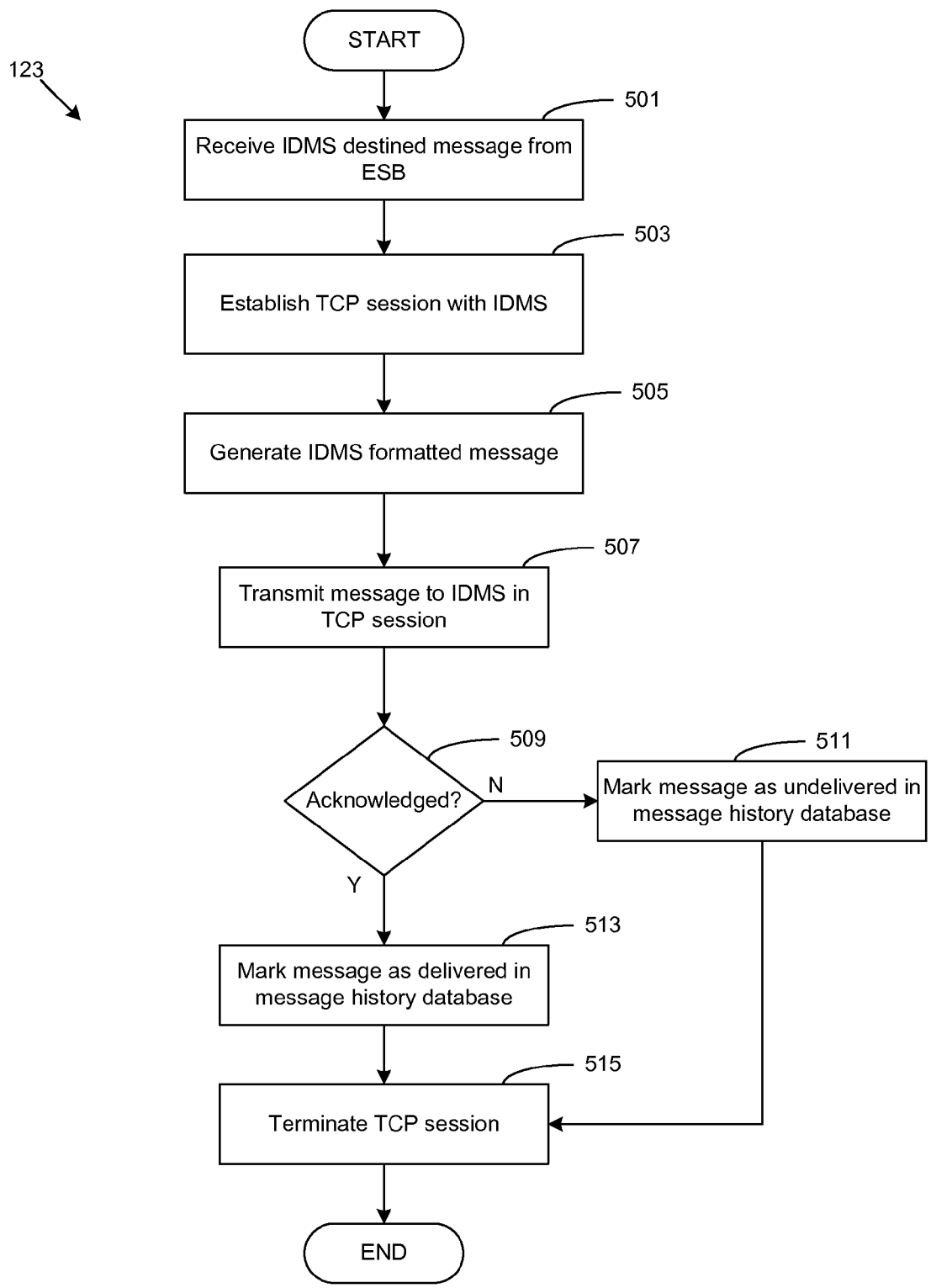

FIG. 5 illustrates an alternative approach in which the IDMS 143 can receive data from a system in the utility computing environment 100. The IDMS channel adapter 123 can receive an IDMS 143 destined message from the ESB 113 in box 501. The IDMS channel adapter 123 can establish a session with the IDMS 143 in box 503. In box 505, the IDMS channel adapter 123 can generate a message in a format acceptable to the IDMS 143, which can be transmitted to the IDMS 143 in box 507. In box 509, the IDMS channel adapter 123 can determine whether the IDMS 143 acknowledges receipt of the message. If the message is not acknowledged, a copy of the message in a canonical message format can be marked as undelivered in the message history database 117 in box 511. If the message is acknowledged, a copy of the message in a canonical message format can be marked as delivered in the message history database 117 in box 513. The TCP session can be terminated in box 515.

Figure 6:
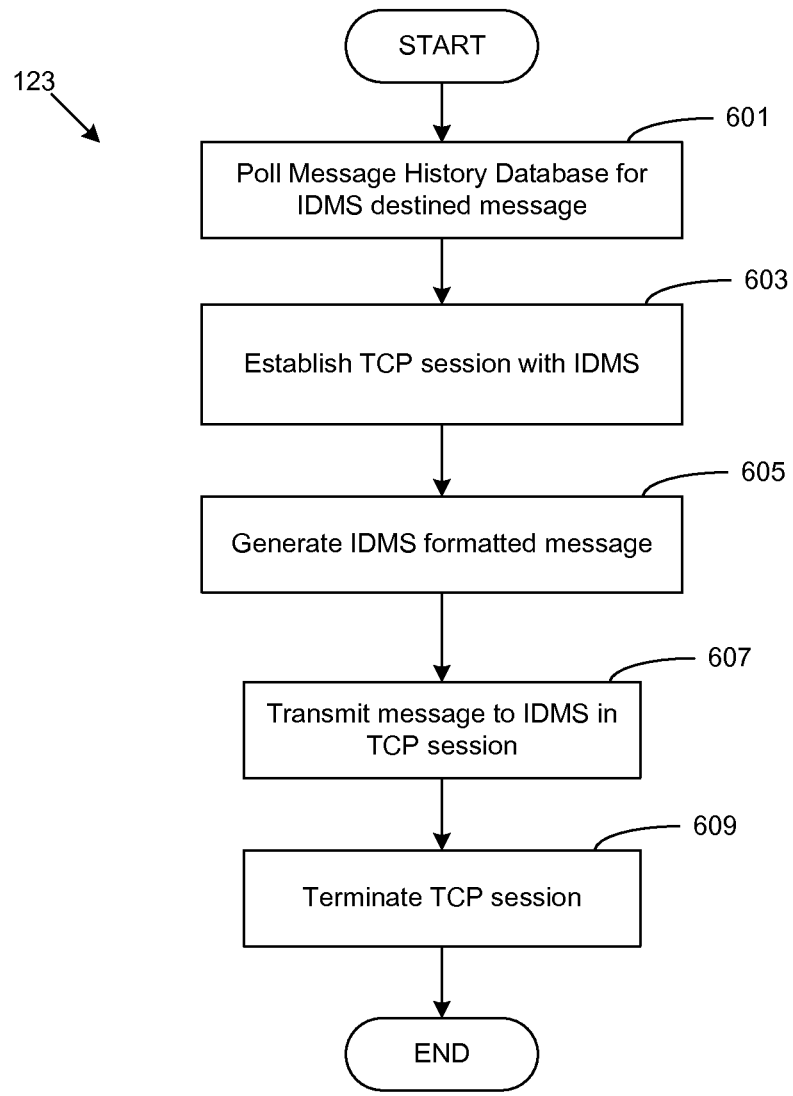

FIG. 6 illustrates an alternative way in which the IDMS 143 can receive data from a system in the utility computing environment 100. The IDMS channel adapter 123 can poll the message history database 117 for a message and/or any data destined for the IDMS 143. Upon locating a message in the message history database 117 destined for the IDMS 143, the IDMS channel adapter 123 can establish a TCP session with the IDMS 143 in box 603. In box 605, the IDMS channel adapter 123 can translate the message from a canonical message format to a format acceptable to the IDMS 143, and the message can be transmitted to the IDMS 143 in box 607. In box 609, the IDMS channel adapter 123 can terminate the TCP session.

Figure 7:
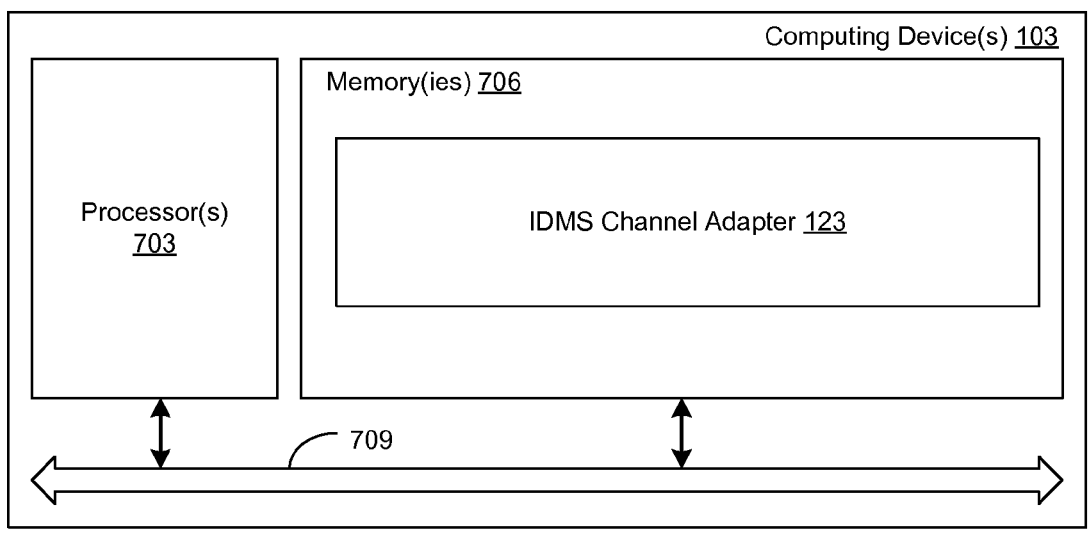
FIG. 7 is a schematic block diagram that provides one example of a computing device in which an IDMS channel adapter can be implemented in the environment of FIG. 1 according to various embodiments of the present disclosure.

With reference to FIG. 7, shown is a schematic block diagram of the computing device 103 that may implement the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are an operating system 705, the IDMS channel adapter 123, and potentially other applications. As described above, in some embodiments, the IDMS channel adapter 123 logic can also be implemented as a stored procedure executed in a database system as well as in an enterprise service bus.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, SQL or any other programming or scripting languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the IDMS channel adapter 123 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 2-6 show the functionality and operation of an implementation of portions of the IDMS channel adapter 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 2-6 show a specific order of execution, it is understood that the order of execution may differ from that which is depicted. For example, the order of execution of two or more blocks may be scrambled relative to the order shown. Also, two or more blocks shown in succession in FIGS. 2-6 may be executed concurrently or with partial concurrence. Further, in some embodiments, one or more of the blocks shown in FIGS. 2-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the IDMS channel adapter 123, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
    establishing, in at least one computing device, a session in a transmission control protocol (TCP) with an integrated distribution management system (IDMS) by opening a socket between the at least one computing device and the IDMS and communicating with the IDMS via the socket, the session having a protocol that is incompatible with an asynchronous messaging framework employed in a service oriented architecture;
    receiving, in the at least one computing device, a request in the session from the IDMS to transmit a message to at least one recipient system;
    translating the message into a message format compatible with an enterprise service bus and a table in a message history database, the message history database and the enterprise system bus being configured to communicate via the asynchronous messaging framework employed in the service oriented architecture;
    publishing the message in a message history database and an enterprise system bus;
    transmitting at least one of a message acknowledgement or an error message to the IDMS in the session;
    creating an entry in the message history database corresponding to the at least one of the acknowledgement or the error message;
    marking the entry as one of delivered or undelivered in the message history database; and
    terminating the session with the IDMS.

2. The method of claim 1, wherein the step of establishing the session further comprises the steps of:
    opening a socket between the at least one computing device and the IDMS; and
    communicating with the IDMS via the socket.

3. The method of claim 1, wherein the message further comprises a request to receive data from the at least one recipient system, and the method further comprising the steps of:
    publishing the request in the message format in the message history database and the enterprise service bus, wherein the request in the message format identifies the at least one recipient system; and
    polling at least one of the message history database and the enterprise service for a response to the request; and
    transmitting at least one of a request response and an error message to the IDMS in the session, wherein the request response is translated to an IDMS message format.

4. The method of claim 1, wherein the at least one recipient system further comprises at least one of a customer information system, a voice system, a workforce management system, or an advanced metering infrastructure head-end.

5. The method of claim 1, wherein the at least one recipient system is at least one advanced metering infrastructure utility meter.

6. The method of claim 1, wherein the message further comprises a request to receive data from an advanced metering infrastructure (AMI) utility metering device, and the method further comprising the steps of:
    publishing the request in the message format in at least one of the message history database and the enterprise service bus, wherein the request in the message format designates the AMI utility metering device as a recipient of the request; and
    polling at least one of the message history database and the enterprise service for a response to the request; and
    transmitting at least one of a ping response and an error message to the IDMS in the session, wherein the response to the request is translated into an IDMS message format.

7. A system, comprising:
    at least one computing device;
    an integrated distribution management system (IDMS) channel adapter executable in the at least one computing device, comprising
        logic that establishes a session in a transmission control protocol (TCP) with at least one integrated distribution management system (IDMS) by opening a socket between the at least one computing device and the IDMS and communicating with the IDMS via the socket, the session having a protocol that is incompatible with an asynchronous messaging framework employed in a service oriented architecture;
        logic that receives a request in the session from the IDMS to transmit a message to at least one recipient system;
        logic that translates the message into a message format compatible with an enterprise service bus and a table in a message history database, the message history database and the enterprise system bus being configured to communicate via the asynchronous messaging framework employed in the service oriented architecture;
        logic that publishes the message in a message history database and an enterprise system bus (ESB);
        logic that transmits at least one of a message acknowledgement or an error message to the IDMS in the session;
        logic that creates an entry in the message history database corresponding to the at least one of the acknowledgement or the error message;
        logic that marks the entry as one of delivered or undelivered in the message history database; and
        logic that terminates the session with the IDMS.

8. The system of claim 7, wherein the logic that establishes the session further comprises:
    logic that opens a socket between the at least one computing device and the IDMS; and logic that communicates with the IDMS via the socket.

9. The system of claim 7, wherein the IDMS channel adapter further comprises logic that translates the message into a message format compatible with at least one of the enterprise service bus and a table in the message history database.

10. The system of claim 9, wherein the message further comprises a request to receive data from the at least one recipient system, and the IDMS channel adapter further comprises:
- logic that publishes the request in the message format in at least one of the message history database and the enterprise service bus, wherein the request in the message format designates the at least one recipient system; and
- logic that polls at least one of the message history database and the enterprise service for a response to the request; and
- logic that transmits at least one of a request response and an error message to the IDMS in the session, wherein the request response is translated to an IDMS message format.

11. The system of claim 7, wherein the at least one recipient system further comprises at least one of a customer information system, a voice system, a workforce management system, or an advanced metering infrastructure head-end.

12. The system of claim 7, wherein the at least one recipient system is at least one advanced metering infrastructure utility meter.

13. The system of claim 7, wherein the IDMS channel adapter further comprises:
- logic that polls the message history database for an IDMS destined message from the at least one recipient system; and
- logic that transmits the IDMS destined message to the IDMS in the session.

14. The system of claim 7, wherein the message further comprises a request to receive data from an advanced metering infrastructure (AMI) utility metering device, and the IDMS channel adapter further comprises:
- logic that publishes the request in the message format in at least one of the message history database and the enterprise service bus, wherein the request in the message format designates the AMI utility metering device as a recipient of the request; and
- logic that polls at least one of the message history database and the enterprise service for a response to the request; and
- logic that transmits at least one of a ping response and an error message to the IDMS in the session, wherein the response to the request is translated into an IDMS message format.

* * * * *

UNITED STATES PATENT AND TRADEMARK OFFICE
CERTIFICATE OF CORRECTION

PATENT NO.         : 8,478,714 B2                                         Page 1 of 1
APPLICATION NO.    : 13/010309
DATED              : July 2, 2013
INVENTOR(S)        : Gregory Ray Floyd et al.

It is certified that error appears in the above-identified patent and that said Letters Patent is hereby corrected as shown below:

In the Specifications

Please insert the following at column 1, line 4:
--STATEMENT REGARDING FEDERALLY SPONSORED RESEARCH OR DEVELOPMENT This invention was made with Government support under Department of Energy (DOE) contract number DE-FC26-07NT43183 awarded by the DOE. The Government has certain rights in this invention.--

Signed and Sealed this
Fourth Day of March, 2014

Michelle K. Lee
*Deputy Director of the United States Patent and Trademark Office*